Oct. 5, 1965   O. JENSEN ETAL   3,210,590
MAIN SERIES CAPACITOR PROTECTIVE SPARK GAP
Filed July 10, 1963   2 Sheets-Sheet 2

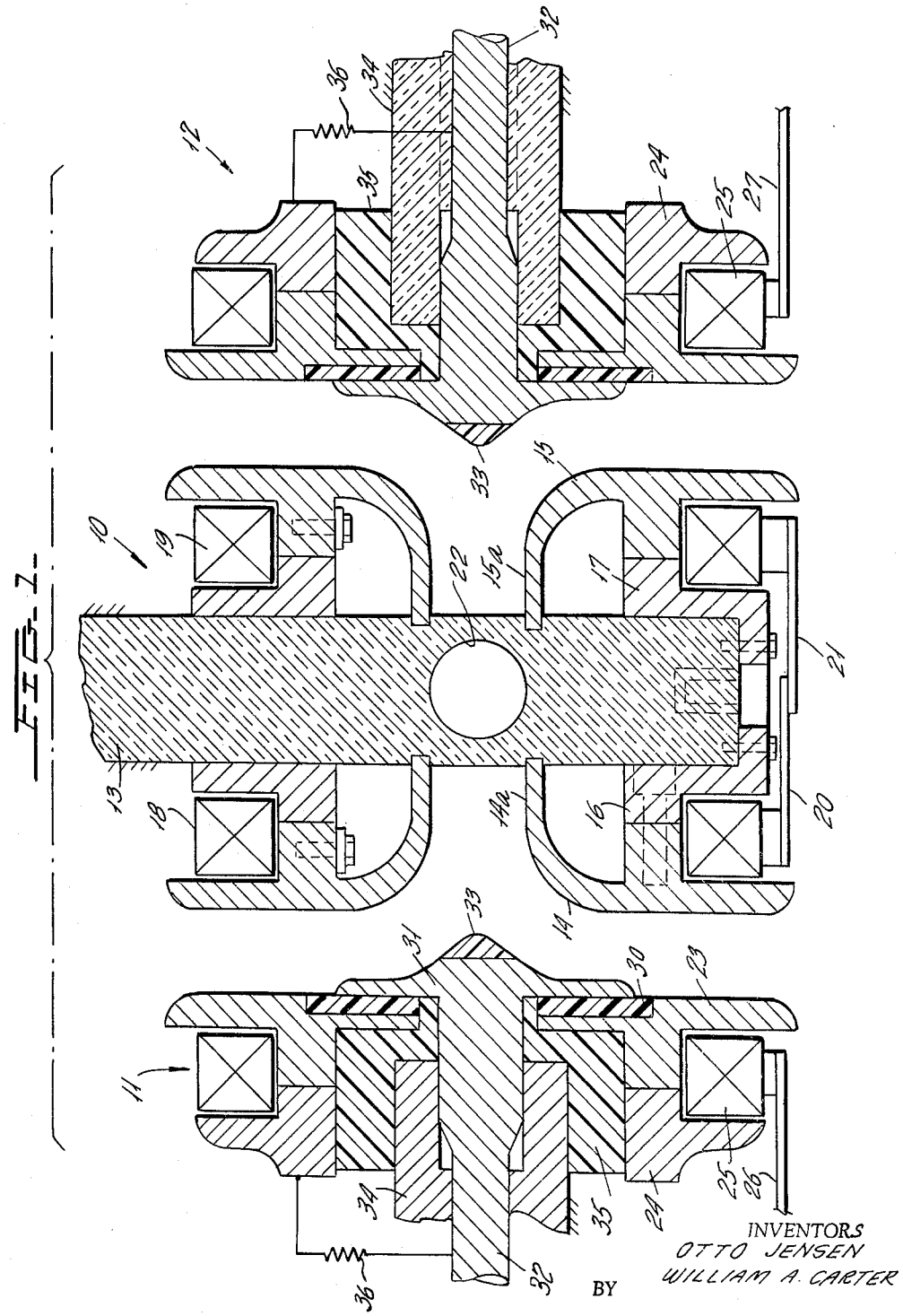

INVENTORS
OTTO JENSEN
WILLIAM A. CARTER
BY
OSTROLENK, FABER, GERB & SOFFEN
ATTORNEYS

United States Patent Office 3,210,590
Patented Oct. 5, 1965

3,210,590
MAIN SERIES CAPACITOR PROTECTIVE SPARK GAP
Otto Jensen, Malvern, and William A. Carter, Devon, Pa., assignors to I-T-E Circuit Breaker Company, Philadelphia, Pa., a corporation of Pennsylvania
Filed July 10, 1963, Ser. No. 294,110
6 Claims. (Cl. 313—325)

This invention relates to spark gaps, and more specifically relates to a novel arrangement for spark gaps used for short circuiting electrical equipment responsive to fault conditions of a predetermined magnitude.

Spark gaps for the protection of series capacitors is well known to the art and is described, for example, in copending application Serial No. 324,758 filed November 19, 1963 entitled Series Capacitor Protective System in the name of David W. Gardner and Murray K. Price and assigned to the assignee of the present invention.

The protection of series capacitors from damage due to excessive voltage resulting from transmission line fault currents requires a short circuiting spark gap whose breakdown time is very short. Under fault conditions, short circuit current may attempt to flow through the series capacitor for the duration of the fault. Such a condition might persist for periods ranging from several cycles to one-half a second. This current would result in destruction of the capacitors. To prevent damage, it is essential that the fault current be diverted from the capacitors. This can be accomplished by placing a voltage sensitive spark gap in parallel with the capacitor bank. This gap must be able to sustain various values of current which must be diverted around the capacitor and it must not be damaged by either the magnitude or duration of the current.

The gap, if properly designed, becomes an important component in the transmission system since its function may be expanded to allow rapid re-insertion of the capacitor following a fault clearance. Rapid re-insertion is essential if a serious stability disturbance is not to result from the removal of the series capacitor by by-passing. Such re-insertion can only be accomplished by arranging for very rapid deionization of the arc products left in the gap, as a result of a previous sparkover. Previous devices have been provided for this purpose, but have been very complex.

The principle of the present invention is to provide a novel spark gap which has a plurality of electrodes associated therewith for control of the ionized products caused by ionization. More specifically, the novel spark gap of the invention is a three electrode device when the central electrode is shaped to allow for axial introduction of a suitable compressed gas such as air, nitrogen, $SF_6$, etc. Each of the electrodes on either side of the central electrode then are comprised of a triggering electrode portion and a main arc ring. The triggering electrode is so shaped with respect to the central electrode that there is a heavy stress concentration of the electrostatic field around the trigger electrode. This insures that a sparkover will always occur at a voltage lower than that which would cause direct sparkover between the main arcing rings. To insure consistency of this "triggering" voltage, the gap is arranged to minimize the migration of ionized particles into the trigger area and through the use of a flushing stream of gas.

Accordingly, a primary object of this invention is to provide a novel spark gap having highly consistent operating characteristics.

Another object of this invention is to provide a novel arrangement for an arc gap which is simple to manufacture.

A further object of this invention is to provide a novel arrangement for an arc gap where the electrodes are so shaped to permit easy removal of ionized particles to accelerate deionizing by cooling.

A further object of this invention is to provide a novel electrode arrangement for spark gaps which produces a non-turbulent flow of radial air for rapid removal of stray ionized particles from the trigger zone.

These and other objects of this invention will become apparent from the following description when taken in connection with the drawings, in which:

FIGURE 1 is a side cross-sectional view of the novel spark gap of the invention.

Figure 4:
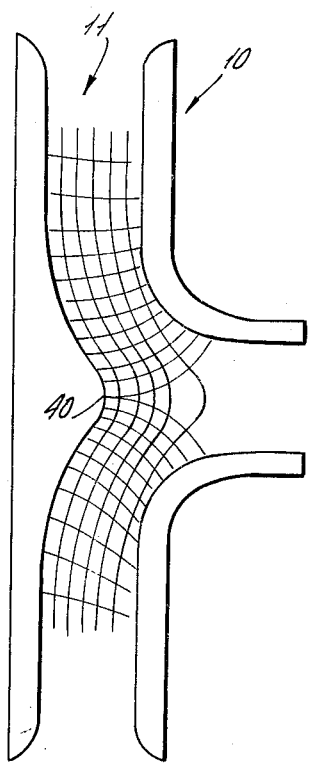
FIGURE 4 illustrates tahe electrostatic field distribution for the trigger gap of FIGURE 1.

Referring first to FIGURE 1, we have shown therein the novel spark gap of the invention as comprised of a central electrode 10 and two outer electrodes 11 and 12 which are identical to one another.

The central electrode is carried from a main insulation support 13 and comprises two symmetric copper rings 14 and 15 which are secured to steel coil retainer rings 16 and 17 respectively as by bolting. The rings 16 and 17 are suitably secured to support 13 as by bolting. Rings 14 and 16, and rings 15 and 17 receive electrical windings 18 and 19 respectively, which could be 10 turn coils and serve to rotate the arc roots of arcs extending to copper electrodes 14 and 15 respectively in the manner described in copending application Serial No. 248,368 filed December 31, 1962 in the name of Otto Jensen entitled High Voltage Spark Gap and assigned to the assignee of the present invention. Thus, one end of windings 18 and 19 are connected to one another by connection straps 20 and 21 respectively, while their other ends are secured to electrodes 14 and 15 respectively.

Figure 2:
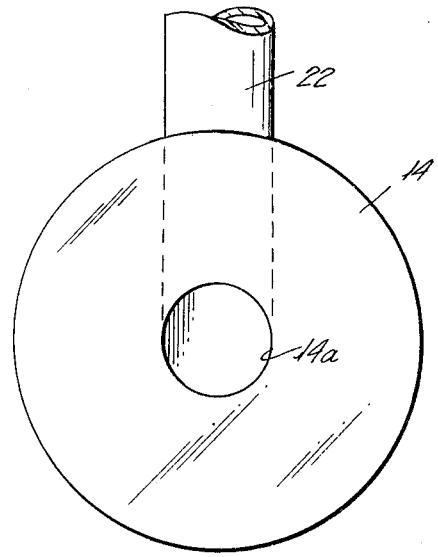
FIGURE 2 is a front view of the central electrode of FIGURE 1.
Figure 3:
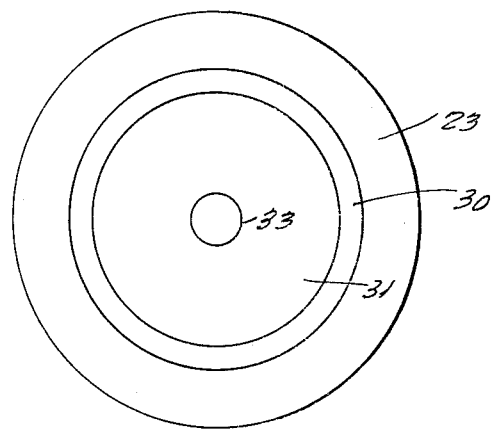
FIGURE 3 is a front interior view of one of the external electrodes of FIGURE 1.

Each of electrodes 14 and 15 are ring shaped and have central openings 14a and 15a respectively therein (FIGURE 2). A gas conduit 22 extends to and terminates in the region of openings 14a and 15a and is connected to a suitable source of gas (not shown) which permits the introduction of a strong flow of gas from conduit 22 through regions 14a and 15a.

The end electrodes 11 and 12 are identical and similar identifying numerals are given similar components. Thus, they are comprised of a main copper ring portion 23 secured as by bolting to a steel coil retainer 24 to provide securement for winding 25. One end of winding 25 of electrode 11 is connected to terminal conductor 26 while the one end of winding 25 of electrode 12 is connected to terminal conductor 27. The other end of winding 25 is then connected to ring 23.

The ring 23 then has an insulation disk 30 of suitable arc resistant material embedded therein which extends under the extending head of a trigger electrode 31. Trigger electrode 31 is of suitable conductive material having a rearwardly extending rod portion 32 and a tip 33 (FIGURE 4) of a special arc resistant conductive material such as Ekonite.

The complete subassembly of elements for each of electrodes 11 and 12 is then placed on a suitable support member such as an epoxy glass tube 34, and all open spaces are filled with a suitable epoxy filling 35. A resistor 36 is then connected from ring 24 to electrode 31. The epoxy tubes 34 and insulating support 13 are then suitably supported by a fixed frame, preferably with the alignment and spacing between electrodes 10, 11 and 12 being adjustable.

FIGURE 4 shows electrostatic field distribution between the generalized electrodes 10 and 11 before a breakdown. This shows a heavy stress concentration at point 40 on the triggering electrode. This is desirable because it insures that a sparkover will always occur at the trigger point at a voltage lower than that which would cause direct sparkover between the main arcing rings. Without contaminating gases being present in the trigger point area, for a given setting the sparkover voltage will be consistent within ±8%. To retain consistency following an arcing period, the gap must be arranged so as to minimize the migration of ionized particles into the trigger area. This is accomplished by a combination of the following factors:

(a) The main arcing ring 23 is of large diameter, thereby introducing an appreciable distance between the inner edge of the ring 23 and the tip of the triggering electrode 33.

(b) The triggering electrode 33 is so shaped to intercept any ionized particles traveling from the arc area, thereby accelerating deionization by cooling.

(c) The triggering electrode 33 is shaped so as to produce a linear non-turbulent radial air flow essential to rapid removal of any stray ionized particles from the trigger zone.

(d) The deionization problem is minimized by holding to a minimum the quantity of ionized material generated at the anode and cathode spot locations. This is accomplished by forcing the arc roots to lie in a path in close proximity to the field generating magnetic coils 18, 19 and 25. Being in a region of intense magnetic fields insures maximum arc peripheral velocity which minimizes the quantity of vaporized metal which is released.

Figure 5:
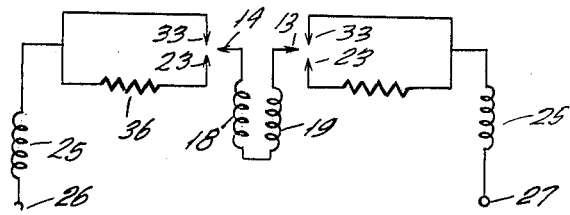
FIGURE 5 is an electrical circuit diagram of the device of FIGURE 1.

The operation of the structure of FIGURES 1 through 4 can be best understood by reference to FIGURE 5 which schematically illustrates the electrical arrangement of FIGURE 1. Assuming that a sufficiently high voltage is impressed on terminals 26 and 27, an initial discharge will occur between electrodes 14 and 13 to trigger electrodes 23 due to the high stress gradient in the vicinity of electrodes 23. A limited current (such as 1000 amperes) will then flow through resistors 36, causing a high voltage drop thereacross. This will cause a flashover from electrodes 33 to electrodes 23, thereby removing resistors 36 from the circuit and momentarily creating a current path from electrode 33, electrode 23 and thence to electrodes 14 and 13. In bypassing resistors 36, this current increases substantially. Since the gap between electrodes 33 to electrodes 14 and 13 is a much shorter gap, and is highly ionized, current flow will follow this path. Since this latter gap is physically remote from trigger electrodes 33, ionization in this gap is free to subside. Note that during this period, the roots of the arcs will be rotated by the windings 25, 18 and 19.

After the fault is removed, and the arc extinguishes, compressed gas from conduit 22 flushes the arcing area so that a further operation may proceed.

Although this invention has been described with respect to preferred embodiments thereof, it should be understood that many variations and modifications will now be obvious to those skilled in the art, and it is preferred therefore that the scope of the invention be limited not by the specific disclosure herein but only by the appended claims.

The embodiments of the invention in which an exclusive privilege or property is claimed are defined as follows:

1. A spark gap comprising a first, second and third spaced electrodes; said first and second electrodes comprising conductive rings in spaced parallel planes; said third electrode being positioned interiorly of said first electrode and comprising a trigger electrode means for triggering an arc from said third electrode to said second electrode; said second ring shaped electrode having a central conical opening therein extending away from the surface of said first and third electrodes; said third electrode having an outwardly conical surface facing toward said central conical opening and terminating in an arcing tip; said outwardly conical surface of said third electrode approximately conforming to the shape of said central conical opening.

2. The spark gap of claim 1 wherein said outwardly conical surface of said third electrode terminates adjacent to and radially spaced from an opening in said first ring shaped electrode whereby arcing from said first electrode to said second electrode occurs in a region removed from central regions of the gap between said second and third electrodes.

3. The spark gap of claim 1 wherein compressed gas is applied to said conical opening in said second electrode to flush ionized air radially out of the gap.

4. The spark gap of claim 1 wherein said third electrode is connected to another electrode of said spark gap through an impedance means.

5. The spark gap of claim 1 wherein an impedance means is connected across said first and said third electrodes thereby to initiate an arc from said first to said third electrode responsive to initiation of an arc from said third to said second electrode.

6. The spark gap of claim 2 wherein said first and third electrodes are formed in a common assembly in insulated relation with one another and spaced from said second electrode.

References Cited by the Examiner

UNITED STATES PATENTS

| | | | |
|---|---|---|---|
| 2,942,152 | 6/60 | Stoelting | 317—12 |
| 3,101,440 | 8/63 | Early | 313—231 |

FOREIGN PATENTS 1,140,256  11/62  Germany.

DAVID J. GALVIN, *Primary Examiner.*